United States Patent [19]
Hullhorst

[11] 3,942,653
[45] Mar. 9, 1976

[54] APPARATUS FOR PROCESSING BODIES
[75] Inventor: William B. Hullhorst, Granville, Ohio
[73] Assignee: Owens-Corning Fiberglas Corporation, Toledo, Ohio
[22] Filed: July 27, 1971
[21] Appl. No.: 166,532

[52] U.S. Cl. .......................................... 214/8.5 K
[51] Int. Cl.² ....................................... B65G 59/00
[58] Field of Search ............. 51/3, 281, 326, 327; 214/8.5 K; 221/222, 223, 297

[56] References Cited
UNITED STATES PATENTS

| 2,695,125 | 11/1954 | Bowen | 214/8.5 K |
| 2,836,018 | 5/1958 | Key | 51/327 |
| 2,840,963 | 7/1958 | Osmond | 221/222 X |

FOREIGN PATENTS OR APPLICATIONS

| 76,643 | 4/1950 | Norway | 221/223 |
| 6,700,492 | 7/1967 | Netherlands | 214/8.5 K |
| 639,623 | 7/1950 | United Kingdom | 221/222 |

Primary Examiner—James L. Jones, Jr.
Attorney, Agent, or Firm—John W. Overman; Harry O. Ernsberger

[57] ABSTRACT

The disclosure embraces a method of and apparatus for processing bodies or tiles such as surfacing tiles fashioned of compressed mineral fibers bonded by a cured binder wherein the bodies or tiles are arranged in stacked or nested relation and the bodies or tiles individually and successively detached or separated from the bottom of the stack and advanced through processing stations at which the bodies or tiles are subjected to finishing operations whereby the bodies or tiles are configurated to substantially uniform size and shape.

1 Claim, 21 Drawing Figures

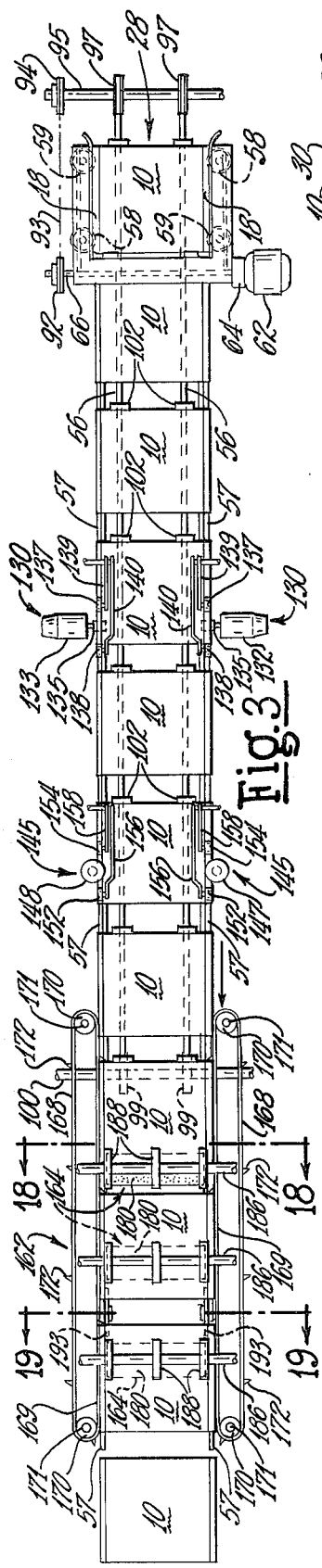

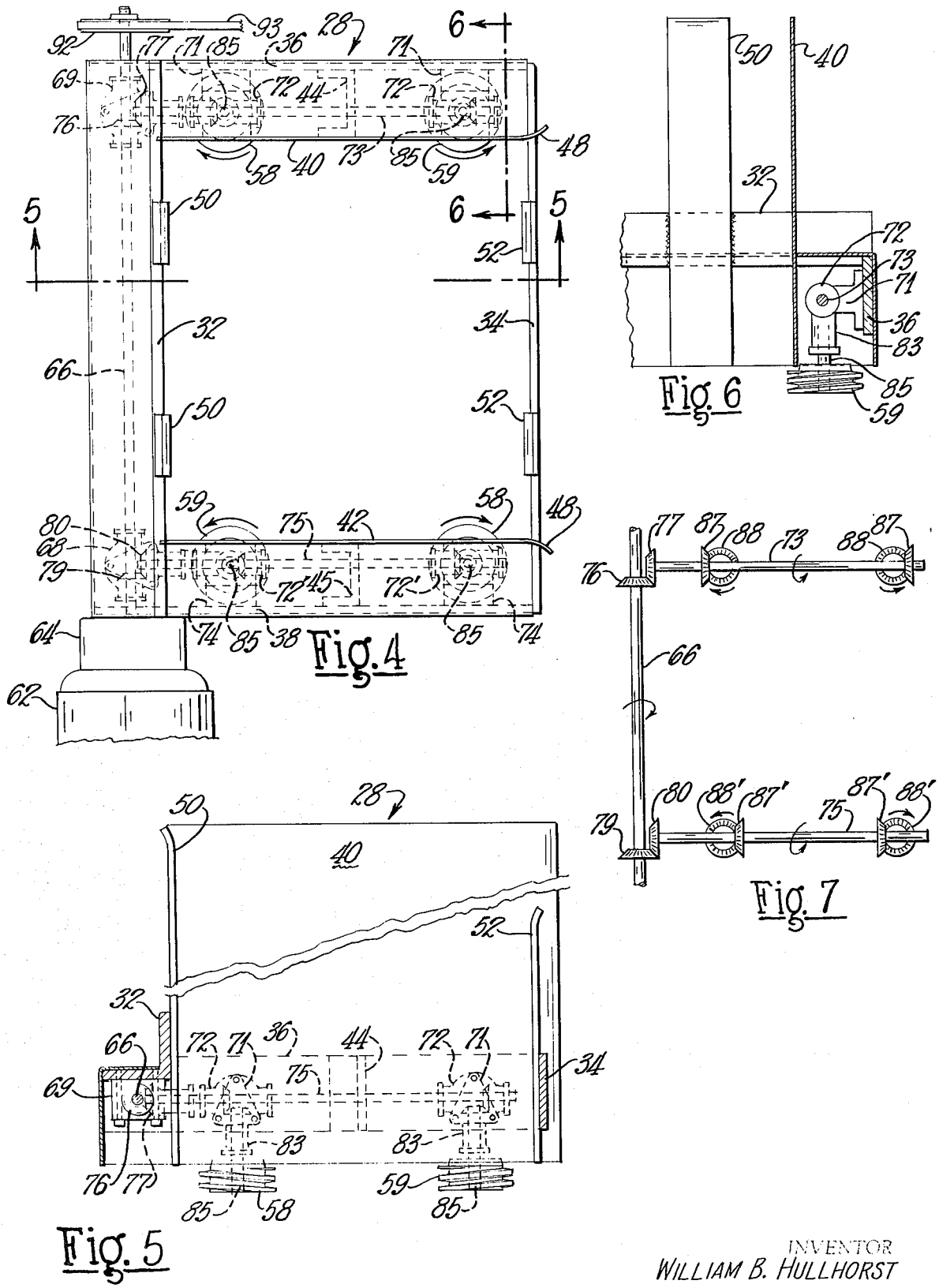

INVENTOR
WILLIAM B. HULLHORST
BY
Staelin + Overman
ATTORNEYS

APPARATUS FOR PROCESSING BODIES

The invention relates particularly to a method of and apparatus for processing bodies, for example, molded bodies, tiles or panels of a character especially usable for surfacing ceilings and walls, the process involving orienting bodies or tiles in nested or stacked relation, successively and automatically removing the tiles from the bottom of the stack and subjecting the tiles to devices performing finishing operations on the tiles to render the tiles of substantially the same size and configuration.

Recent developments have been made wherein a plurality of bodies, such as tiles or panels, are fashioned of fibers of mineral material, such as glass fibers, by compressing a mass of binder-bearing fibers into a multiple section molding die which configurates or contours the mass of fibers into a plurality of connected substantially rigid bodies or tiles. The connected assembly of bodies or tiles is then subjected to a severing or stripping process wherein the body or tile configurations of the molded assembly or unit are severed one from another to provide individual bodies or tiles. The individual bodies or tiles have areas which are unfinished such as residual protuberances not removed by the severing or stripping operations and other areas which require smoothing or finishing for sizing and shaping the bodies or tiles so that the finished bodies or tiles are of substantially uniform character. The finishing or sizing operations are essential in order that the bodies or tiles may be properly and accurately assembled as a wall or ceiling surfacing.

The invention embraces a method of establishing a stack of molded bodies or tiles and successively withdrawing, separating or removing each of the bodies or tiles individually from the bottom of the stack and successively conveying the removed bodies or tiles through a finishing station or stations at which roughness or roughened regions of the tiles are subjected to abrasive or finishing operations and the surfaces rendered smooth to provide bodies or tiles of uniform size, character and attractive appearance.

An object of the invention embraces a method involving stacking bodies and successively withdrawing the bodies from the bottom of the stack by instrumentalities effective to separate the lowermost body from the stack while providing support for the remaining bodies of the stack.

Another object of the invention is the provision of apparatus for processing molded bodies or tiles, the apparatus including an arrangement for supporting a stack of bodies or tiles, the stack supporting means being relatively movable for successively withdrawing or removing bodies or tiles from the bottom of the stack to separate the tiles for further processing operations.

Another object of the invention is the provision of an arrangement including apparatus for supporting a stack of molded bodies or tiles including means for selectively withdrawing bodies or tiles from the bottom of the stack and subjecting the withdrawn tiles individually to abrading devices for removing any burrs or roughness resulting from the molding operation to properly size the bodies or tiles as well as to improve the appearance thereof.

Another object of the invention resides in a feeding device usable with a stack of bodies or tiles involving rotatable means effective to separate the lowermost body or tile of the stack from the remaining bodies or tiles in a manner to assure the separation of the lowermost body or tile only from the stack to facilitate further processing operations on the individual bodies or tiles removed from the stack.

Another object of the invention resides in an arrangement for feeding molded bodies or tiles successively to abrading or deburring stations, the apparatus including means for successively removing bodies or tiles from the bottom of a stack of the bodies or tiles and effecting cleaning or deburring of pad surfaces at opposite edge regions of the bodies or tiles and subjecting other surfaces or areas to abrading devices to establish a uniform vertical dimension between the pad surfaces and the opposed edge regions of the bodies or tiles in order that in assembling the tiles on a wall or ceiling they may be properly positioned or interengaged to present a generally planar wall or ceiling surfacing.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 2 is a semischematic side elevational view of a form of apparatus for carrying out the method of the invention;

FIG. 3 is a top plan view of the arrangement shown in FIG. 2;

FIG. 4 is a top plan view of a container for a stack of bodies and a body separating or feeding device;

FIG. 5 is a sectional view taken substantially on the line 5—5 of FIG. 4;

FIG. 6 is a fragmentary sectional view taken substantially on the line 6—6 of FIG. 4;

FIG. 7 is a schematic view of the drive arrangement for the body separator or feeder shown in FIGS. 4 and 5;

FIG. 16 is a sectional view taken substantially on the line 16—16 of FIG. 2;

FIG. 17 is a sectional view taken substantially on the line 17—17 of FIG. 2;

FIG. 18 is a sectional view taken substantially on the line 18—18 of FIG. 3;

FIG. 19 is an enlarged fragmentary sectional view taken substantially on the line 19—19 of FIG. 3;

FIG. 20 is a view illustrating another form of means for abrading certain regions of the tiles or bodies, and FIG. 21 is a fragmentary end view of the arrangement shown in FIG. 20.

The method and apparatus of the invention are especially adapted for handling and processing molded bodies, tiles or panels of compressed fibers and cured binder, such as tiles or panels of glass fibers of a configuration to be conveniently stacked for successive separation, it being understood that the method and apparatus may be used for processing other types of bodies fashioned of other materials. The illustrated embodiment of the apparatus is of a character especially adapted for handling and processing molded fibrous bodies or tiles of rectangular configuration having pads or projections extending from opposed edge regions and flanges at the other edge regions which are engaged by instrumentalities performing finishing operations to configurate the bodies or tiles to substantially uniform size and shape.

Figure 1:
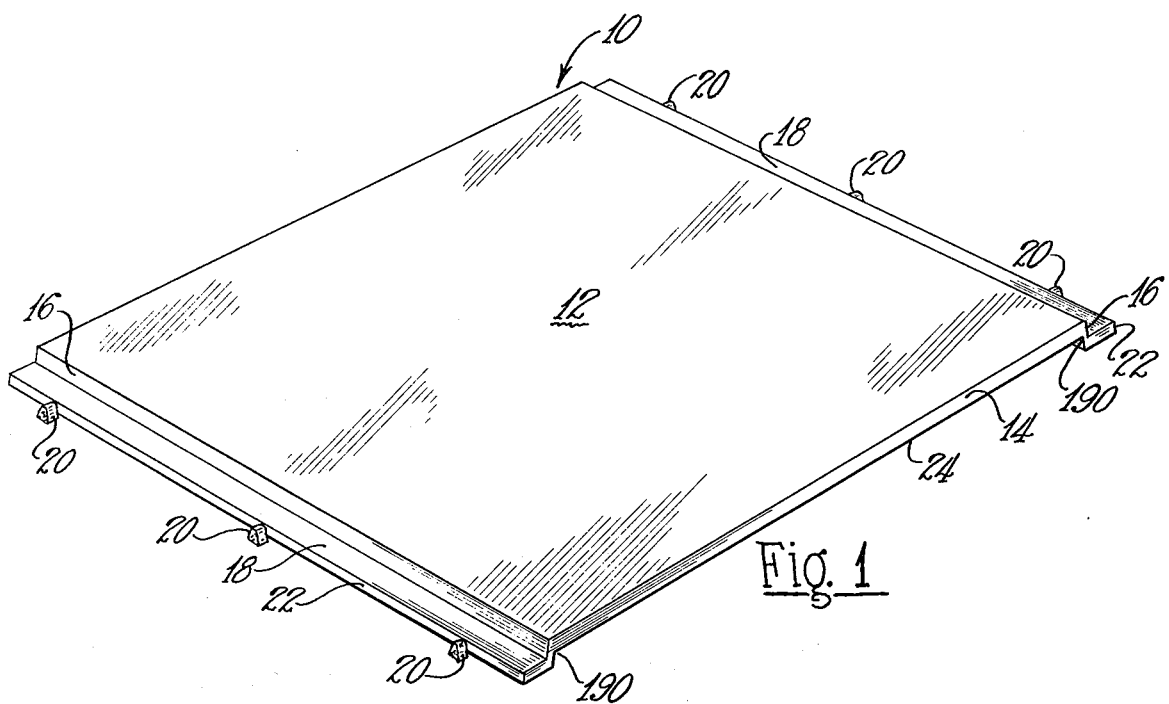
FIG. 1 is an isometric view of a molded body or tile as stripped from a molded unit of several bodies or tiles.

Referring initially to FIG. 1, there is illustrated a substantially rigid molded body, tile or panel fashioned of fibers, for example, glass fibers, compressed to a high density and the binder, such as phenolformaldehyde, in the compressed mass of fibers heat cured or set in the molding operation. As shown in FIG. 1, the body, tile or panel 10 is of substantially rectangular shape and, in the molding operation, several of the tiles or bodies 10 in connected relation are simultaneously molded, the individual bodies or tiles being subsequently severed one from another. Each tile 10 is inclusive of a rectangular planar central section 12 having generally transversely extending flanges 14 on two opposed edge regions of the tile, the other opposed edge regions of the central section 12 being fashioned with transversely extending flanges 16, the flanges 16 being integrally joined with projections, pads or tabs 18.

The tabs or projections 18 are of a height so as to extend beneath edge flanges 14 of adjacent tiles in assembly in covering a wall or ceiling surface with the tiles. The projections or tabs 18 provide means for securing the tiles or bodies to wall or ceiling surfaces by nails or staples driven through the tabs 18 or the tabs may be glued or otherwise adhesively secured to the wall or ceiling surfaces or other supports. In assembly with other tiles, the tabs or projections 18 are covered or obscured from view by adjacent tiles.

In fashioning the tiles or bodies 10, several of the bodies or tiles are simultaneously molded in single mold and are connected by narrow connectors or bridges 20 extending from the pads or projections 18, the bridges between adjacent tiles having been severed when the tiles, after molding, are severed or separated one from another. The method and apparatus of the invention enable the separation and feeding of successive tiles from a stack and each of the separated tiles successively subjected to instrumentalities for removing the bridges 20 and for sizing and smoothing other regions of the tiles or bodies.

The instrumentalities for removing the bridges or connectors 20 from the tiles also effect a smoothing or sizing of the edge surfaces 22 of the pads or projections 18. The lower surfaces of the projections 18 are subjected to instrumentalities for smoothing and sizing these surfaces. The apparatus is also inclusive of means for smoothing and sizing the lower edges 24 of the laterally extending flanges 14 of the body or tile 10.

The apparatus for guiding and supporting a stack of tiles or bodies and for successively removing a lowermost tile or body from the stack for deposit or delivery onto a conveyor is illustrated in FIGS. 2 through 15. With particular reference to FIGS. 2 through 6, there is illustrated a receptacle or guide means 28 in which is disposed a stack 30 of tiles or bodies 10. The guide means or receptacle 28 for containing the stack 30 of tiles or bodies is inclusive of a frame structure comprising transversely extending longitudinally spaced members 32 and 34, the member 32 being substantially L-shaped in cross section, as shown in FIG. 5.

The end regions of the members 32 and 34 are joined or secured to the ends of members 36 and 38, providing with members 32 and 34, a substantially rectangular frame configuration. The apparatus includes transversely spaced tile or body guiding walls or members 40 and 42 which are spaced apart a distance to snugly, yet slidably, accommodate the stack 30 of tiles 10, there being sufficient clearance between the tiles and the guide walls as not to impair downward movement of the stack of tiles occurring at each successive withdrawal of a tile or body from the bottom of the stack.

The guide walls 40 and 42 may be supported in any suitable manner as by brackets 44 and 45 secured to members 36 and 38. The walls 40 may be welded or otherwise secured to the brackets so as to avoid any projections at the interior surfaces of the walls 40 and 42 which would impair vertical downward movement of the tiles. The vertical edge regions of the walls may be curved or flared as shown at 48 to facilitate delivery of a stack of tiles into the tile guiding means or receptacle.

Means is provided adjacent the members 32 and 34 for guiding and maintaining the tiles of the stack in a vertical position so that the tiles are properly engaged with tile support or feeder means hereinafter described. Secured to the vertically disposed portion of the bar or member 32 are spaced tile guiding members or means 50. Also mounted upon the bar 34 is a second pair of vertically disposed tile guiding members 52. The guides of each pair of members 50 and 52 are spaced transversely in order to facilitate manual delivery of a stack of tiles between members 50 and 52 and between the walls 40 and 42.

The pairs of brackets 50 and 52 are preferably welded respectively to the bars 32 and 34 so as to avoid any projections which would impair downward movement of the tiles or bodies. As shown in FIGS. 2 and 3, the tile guiding means or stack receptacle construction 28 is disposed above a region of a pair of endless conveyor chains 56 or means for conveying tiles or bodies delivered from the bottom of the stack 30 for further processing.

Figure 12:
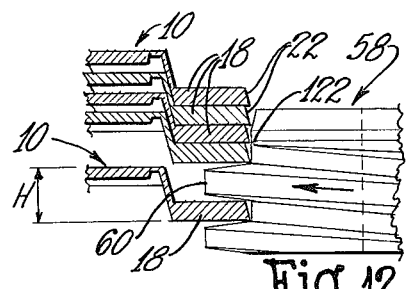
FIG. 12 is an elevational view of a portion of one of the body or tile feeding or separating elements illustrating a relative position of the feeder element with respect to a stack of bodies or tiles.

Means is provided for supporting the stack 30 of bodies or tiles, the means being movable to successively separate the lowermost tile of the stack from the remaining tiles for delivery onto support rails 57 adjacent the upper flights of the conveyor chains 56. As shown in FIGS. 2 and 12 the tiles or bodies 10 are nested in vertical stack formation with the pads or projections 18 in adjacent relation as particularly shown in FIG. 12.

The body or tile supporting and feeding instrumentalities or means are relatively movable or rotatable and have inclined or helical surfaces adapted to engage a lowermost tile or body of the stack for supporting the tiles above the lowermost tile or body and for progressively moving the lowermost tile downwardly to separate the same from the stack for discharge from the tile feeding means whereby the disengaged tile descends or falls by gravity onto the rails or support means 57.

The body or tile supporting and feeding means and associated components are illustrated in FIGS. 4 through 15 and are inclusive of pairs of rotatable cams, members or instrumentalities 58 and 59, the cams of each pair being disposed as shown in FIGS. 4 and 5 for supporting the tiles adjacent their corner regions. The cams or members 58 and 59 are fashioned with inclined, helical or spiral cam-like configurations or surfaces whereby the movable or rotating members engage a lowermost tile of the stack and separate such tile from the stack and convey or feed it downwardly by means of the helical or inclined surface or contour of a cam portion of each of the members 58 and 59 until the tile falls by gravity from the support members 58 and 59.

Figure 8:
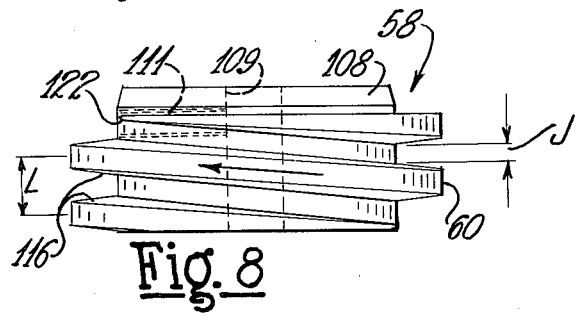
FIG. 8 is an elevational view of one of the body or tile separator or feeder elements having a right-hand spiral cam configuration.
Figure 11:
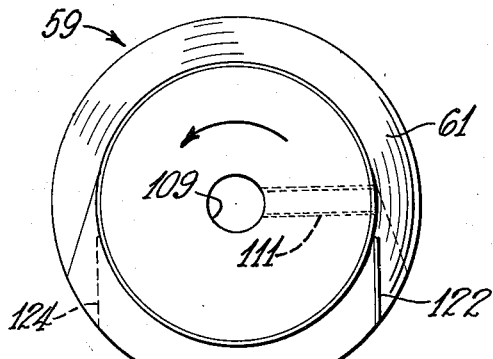
FIG. 11 is a top plan view of the construction shown in FIG. 10.

The cams 58 have right-hand helical configurations 60 as shown in FIG. 8, and the cams 59 have left-hand helical configurations 61 as shown in FIG. 11. The progressive action of the helical or inclined surfaces of the cams or members 58 and 59 in disengaging the lowermost tile or body of the stack and conveying it downwardly to a discharge region is illustrated in FIGS. 12 through 15 and will be hereinafter described in detail.

The tile support and feeder cams 58 and 59 are journally supported within the receptacle or guide means 28 and are adapted to be rotated at the same speed so that a tile engagaed therewith remains in a horizontal position during its downward movement to the discharge region of the cams. It is important that the speed of rotation of the members or cams 59 and 60 be correlated or synchronized with the rate of advancement of the conveyor chains 56 so that the tiles or bodies successively delivered from the receptacle 28 are received on the support rails 57 at equal time intervals whereby the tiles 10 are in spaced relation for advancement by the conveyor means 56 to processing stations.

The cams 58 and 59 are disposed so that they are engaged with the projections 18 on opposed edge regions of the tiles 10 for supporting the stack of tiles in the receptacle 28. The conveyor chains 56 and the cams 58 and 59 are actuated or rotated in synchronized relation by a motor 62, illustrated in FIGS. 1 and 2 through suitable speed reducing mechanism contained within a housing 64. A shaft 66 is journally supported in bearings 68 and 69 mounted by member 32, the shaft being driven by the motor 62 through the speed reducing means Means is provided driven by the shaft 66 for simultaneously rotating the four tile supporting and feeder cams or members which successively separate the lowermost tile from the stack. Secured to the frame member 36 are brackets 71 mounting bearings or bearing members 72 in which is journaled a shaft 73, the shaft being disposed normal to the shaft 66 as illustrated in FIGS. 4 and 7. Also secured to the frame member 38 are brackets 74 of the same character as the brackets 71. The brackets 74 provide bearings 72' in which is journaled a shaft 75, the shaft 75 being disposed normal to the shaft 66.

Fixedly mounted on shaft 66 is a miter gear 76 which meshes with a miter gear 77 secured on the shaft 73 whereby the shaft 73 is driven by the shaft 66. Also secured on the shaft 66 is a second miter gear 79 which meshes with a miter gear 80 fixed on the shaft 75 whereby the shaft 75 is driven from the shaft 66. The shaft 73 is adapted to rotate two of the four cams and the shaft 75 is adapted to rotate the other two cams. Each of the brackets 71 is fashioned with a depending portion 83 as illustrated in FIG. 6, the brackets 74 being provided with similar depending portions.

Journaled in each of the depending portions 83 is a vertically disposed shaft 85, and a tile support and feeder cam is fixedly secured on each of the shafts 85, the cams 58 and 59 being disposed below the lower edge of the receptacle or tile guide 28 as shown in FIG. 5. Two of the shafts 85 equipped with one each of cams 58 and 59 are rotated through pairs of miter gears, each pair including a driving miter gear 87 mounted on the shaft 73 enmeshed with a driven gear 88 mounted on a shaft 85. Thus two of the cams are rotated in opposite directions.

The other two shafts 85, each carrying a cam member, are rotated in opposite directions from the shaft 75 by pairs of miter gears, each pair comprising driving gears 87' mounted on the shaft 75 and meshing with driven gears 88' mounted on the shafts 85. As the four cam members are in concomitant engagement with the projections 18 of the lowermost tile of a stack of tiles, it is imperative that the cams 58 rotate in one direction and that the cam members 59 rotate in the opposite direction so as not to cause any lateral movement or displacement of a tile during its engagement with the cam members. As shown in FIG. 7, the miter gears 88 rotate in opposite directions as indicated by the arrows, and the miter gears 88' likewise rotate in opposite directions as indicated by the arrows.

Fixedly mounted upon the shaft 66 is a sprocket 92 connected by a chain 93 with a sprocket 94 mounted upon a shaft 95, the shaft being journaled for rotation in a support (not shown). Mounted upon the shaft 95 are sprockets 97 which are engaged with the conveyor chains 56 providing a conveyor means for advancing the tiles delivered by the feeder cams 58 and 59 through other stations for processing. The conveyor chains 56 embrace a second set of sprockets 99 mounted upon a shaft 100, the sprockets 97 and 99 supporting the chains 56.

The conveyor means or chains 56 are provided with abutments or lugs 102 spaced as illustrated in FIGS. 1 and 2 so that as the tiles 10 are successively delivered onto the supports or rails 57, a pair of abutments 102 engages the tiles so that the tiles are advanced by the conveyor means 56 and each tile spaced from adjacent tiles an equal distance so as to facilitate further processing of each tile. As the conveyor means 56 are advanced in correlated or synchronized relation with the rotation of the tile feeder cams 58 and 59, the tiles are sequentially deposited on the conveyor at intervals so that each tile is engaged with a pair of the abutments 102.

As shown in FIG. 3, the tiles are supported by rails 57 arranged at the respective sides of the conveyor chains 56, the rails engaging in the recess in a tile adjacent each of the projections 18 so that the tiles are properly aligned for rectilinear movement by the conveyor means through subsequent processing stations, portions of the rails 57 also engaging the projections 18 of the tiles.

Figure 9:
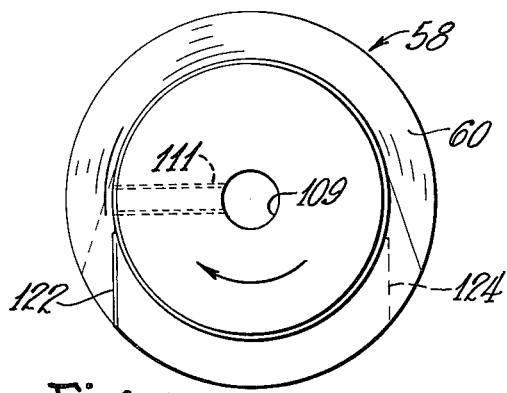
FIG. 9 is a top plan view of the construction shown in FIG. 8.
Figure 10:
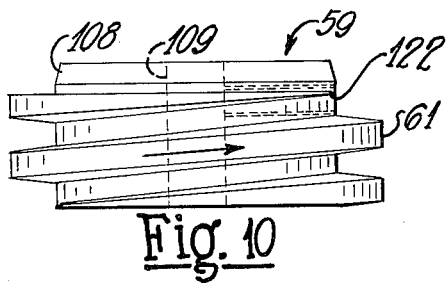
FIG. 10 is an elevational view of one of the body or tile separator or feeder elements having a left-hand spiral cam configuration.

One of the body or tile supporting and feeding elements or cams 58 is illustrated in FIGS. 8 and 9, and one of the cams 59 is illustrated in FIGS. 10 and 11. The progressive action of separating a lowermost tile from the bottom of the stack of tiles and its delivery from the feeder cams is illustrated in FIGS. 12 through 15. Each of the cams 58 and 59 is fashioned with a hub or body portion 108 having an axial bore 109 which snugly receives a driving shaft 85. Each cam is provided with a threaded bore 111 adapted to receive a securing screw for securely fastening the cam to its driving shaft.

Each of the cams 58 is inclusive of a right-hand helical cam configuration 60 resembling a helical thread or a worm gear, each cam comprising substantially 1½ helical revolutions as illustrated in FIGS. 8 and 9. The lead or pitch of the worm or helix 60 indicated at L is preferably equal to the total height of a body or tile 10 indicated at H in FIG. 12. The helical convolution 60 is fashioned with angular sides 116 so that at the root of the helical groove defined by the helical convolution 60, the height of the groove, indicated by J in FIG. 8, is sufficient to accommodate the thickness of a pad portion 118 of a tile as illustrated in FIGS. 12 through 15.

The leading edge of the helix 60 is indicated at 122, the leading edge being effective during rotation of the cam to initially separate the lowermost body or tile 10 from the stack. It should be noted from FIGS. 12 through 15 that the edge regions 22 of the pads or projections 18 are of an acute angle so that the bottom surfaces of the projections 18 extend outwardly providing ledges adapted to be successively engaged by the leading edge 122 of the helix 60 so as to assure positive separation of the lowermost tile from the stack without damage to the adjacent tile.

Each of the cams 59, shown in FIGS. 10 and 11, is substantially identical with the cam 58 except that the cam configuration 61 of the cam 59 is a left-hand helix. With reference to FIG. 4, the lower right-hand cam 58 and the upper left-hand cam 58 are of right-hand helical configuration and the other two cams 59 are of left-hand helical configurations. With the pairs of cams 58 and 59 rotating in opposite directions, there is no tendency for the tiles in engagement with the cams to be biased or moved in a transverse direction.

FIGS. 12 through 15 illustrate successive relative positions of tiles during progressive separation of individual tiles from the stack supported by the feeder cams. FIG. 12 is illustrative of the position of the lowermost tile 10 upon rotation of the cams through one complete revolution, the lowermost tile 10 being completely separated from the adjacent tile and the leading edge 122 of the helix of each of the cams being in position to engage the projections 18 of the third tile from the bottom of the stack.

Figure 13:
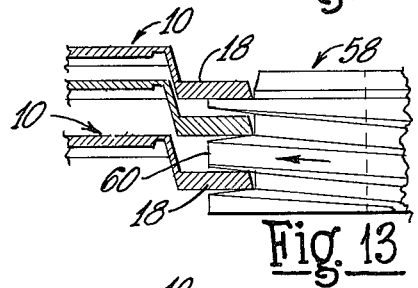
FIG. 13 is a view similar to FIG. 12 with the body or tile separator or feeder element rotated through sixty degrees illustrating the relative position of the feeder element and the adjacent bodies or tiles of the stack.
Figure 14:
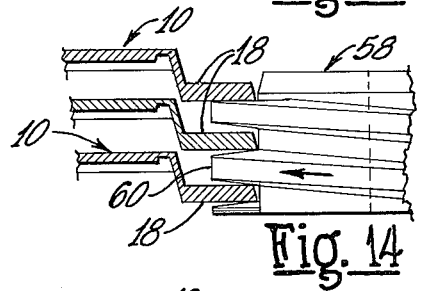
FIG. 14 is a view similar to FIG. 13 with the feeder element rotated through an additional sixty degrees illustrating the relationship of this position of the feeder relative to the tiles in the stack.

FIG. 13 illustrates the relative positions of the three lowermost tiles of the stack upon additional rotation of the cams through about sixty degrees from the position shown in FIG. 12. FIG. 14 illustrates the relative position of the three lowermost tiles of the stack with the cams rotated through an additional sixty degrees. It will be seen from FIG. 14 that the three lowermost tiles 10 of the stack are completely separated one from another.

Figure 15:
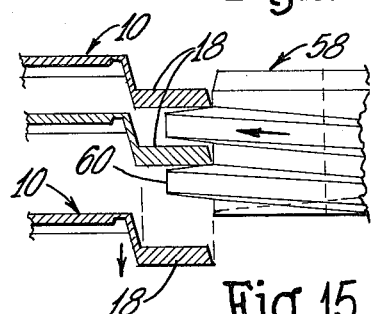
FIG. 15 is a view similar to FIG. 14 with the feeder element rotated through an additional sixty degrees and illustrating the relationship of the adjacent tiles and the delivery or separation of the lowermost tile from the feeder element.

FIG. 15 illustrates the relative position of the three lowermost tiles upon an additional sixty degrees of rotation of the cams. In such position the lowermost tile 10 is released from the trailing edges 124 of the cams and falls by gravity onto the stationary rails or members 57, shown in FIGS. 3, 16 and 17. As the upper flights of the chain conveyors 56 are being advanced in a left-hand direction, as viewed in FIGS. 2 and 3, in synchronized relation with the rotation of the cams 58 and 59, the lowermost tile of the stack delivered from the cams is engaged by a pair of abutment blocks 102 carried by the chains 56.

In the embodiment of the cams illustrated in the drawings, the helical configurations 60 and 61 are preferably of an angularity or pitch as to separate the lowermost tile from the stack, during one revolution of the cams, a distance substantially equal to the height of a tile. In the embodiment illustrated, the peripheral length of a helical configuration from the leading edge 122 at the upper end of the helix to the trailing edge 124, being the lower terminus of the helix, is about one and one-half revolutions of a helix or about 540°. It is to be understood that, if desired, the helical configurations may be of greater length.

The central section 12 of a tile, shown in FIG. 1, provides a surface which is square and the tabs or projections 18 on one opposed pair of edges provide for elongation of the tile or body by reason of the width of the projections. The distance between the guide walls or members 40 and 42, shown in FIG. 4, and the distance between the guide members 50 and 52 are such as to receive the stack of tiles with sufficient clearance so that the stack of tiles may move downwardly by gravity with the delivery of the lowermost tile of the stack. The helical portions of the cams are of sufficient diameter to engage the projections 18 of a lowermost tile whereby the stack of tiles if supported solely by the helical configurations of the cams.

The tiles or bodies delivered from the feeder cams 58 and 59 are advanced by the conveyor chains or members 56 to a first processing station indicated at 130 in FIGS. 2, 3 and 16. The arrangement at the first station includes instrumentalities adapted to abrade or smooth the lower surfaces of the projections or tabs 18 of the tiles 10. The apparatus at the first station is inclusive of electric motors 132 and 133, the shaft of each motor being equipped with an abrading wheel 135, the wheels 135 being rotatable about horizontal axes. The tile supporting rails 57 are provided with openings or slots 136 for accommodating the abrading wheels 135.

The abrading wheels 135 engage the lower surfaces of the tabs or projections 18 of the tiles 10 in the manner illustrated in FIG. 16. Pairs of rolls 137 and 138 disposed above the tiles are supported by pivotally mounted arms 139 and 140, the pairs of rolls exerting downward pressure on a tile at the station 130 providing a hold-down means to prevent upward movement of a tile during engagement of the abrasive members or wheels 135 with the projections or pads 18 of the tile. The tiles are continuously and successively advanced by the conveyor chains 56 so that the abrasion of the projections 18 occurs during advancing movement of the tiles.

A second processing station is indicated at 145 illustrated in FIGS. 2, 3 and 17. At the processing station 145 instrumentalities engage the edge regions 22 of the pads or projections 18 of the tiles. The processing station 145 is inclusive of motors 147 and 148 having vertically disposed shafts, the motors being arranged respectively adjacent each of the tile supporting rails 56 mounted by suitable means (not shown).

The shaft of each of the motors supports a frustoconically shaped abrading wheel 150, the wheels being rotated about vertical axes, the frusto-conically shaped surfaces being adapted to smooth the angularly disposed edge regions 22 of the projections 18 and to remove the residual bridge portions 20 from the tiles. Pairs of rolls 152 and 154, supported respectively by pairs of members or arms 156 and 158, engage the upper surfaces of the tabs or projections 18 exerting downward pressure on the projections providing a hold-down means for the tiles so as to prevent shifting or dislodgment of the tiles transversely or vertically during engagement of the abrading wheels 150 with the edges of the projections.

If desired, the abrading wheels 150 may be of circular cylindrical shape and the axes of the motors 147 and 148 disposed in acute angular relation with respect to the plane of the major surface of the tiles to provide the proper abrading relation with the angular edges 22 of the projections 18 on the tiles.

The tiles processed at the stations 130 and 145 are advanced by the chains 56 to a region at which the tiles are engaged with second conveyor means, the latter conveying the tiles to a third processing station indicated at 162. The processing station 162 is inclusive of instrumentalities engageable with the edges 24 of the laterally-extending flanges 14 of the bodies or tiles 10 to size the height of the flanges and remove any irregularities resulting in the molding operation. The station 162 is inclusive of a plurality of instrumentalities or units 164 for abrading or smoothing and sizing the flanges 14 of the tiles.

In the embodiment illustrated, there are three instrumentalities or units 164 arranged in lengthwise spaced relation as illustrated in FIGS. 2 and 3, one of the instrumentalities being shown in FIG. 18. The tiles or bodies being advanced by engagement of the conveyor chains 56 are engaged with abutment blocks 102 carried by the chains. In order to subject the lower edges of the tile flanges 14 to abrading devices, the tiles moving through the processing station 162 are advanced by a second conveyor means which includes two endless chains 168 arranged respectively adjacent opposite sides of the advancing tiles.

Each of the conveyor chains 168 is engaged with a pair of sprockets 170, each sprocket being mounted on a vertical shaft 171, the chains 168 being driven by conventional motive means (not shown) arranged to rotate one sprocket of each pair for advancing the inner flights 169 of the chains in a left-hand direction as viewed in FIG. 3. The linear rate of movement of the conveyor chains 168 is at least equal to the linear rate of movement of the conveyor chains 56 so that the tiles are advanced through the processing station 162 at a speed not less than the rate of advancement of the tiles or bodies by the chains 56.

Each of the conveyor chains 168 is provided with transversely-extending projections or lugs 172 which are spaced so that successive lugs engage successive tiles or bodies for advancing the same through the processing station 162. The lugs or projections 172 are disposed on the conveyor chains 168 so as to engage the ends of the projections 18 of the tiles.

The processing station 162 is inclusive of instrumentalities, units or means 164 for smoothing the edges 24 of the flanges 14, one form of means being illustrated in FIGS. 2, 3 and 18. In the embodiment illustrated, vibrator units or means 164 provided with abrasive elements are vibrated transversely of the path of travel of the bodies or tiles, there being three units equipped with abrasive elements and supporting members 176 arranged in spaced relation lengthwise of the movement of the bodies or tiles, the vibrating units or devices being of conventional construction.

Each of the vibrator units or abrading devices 164 includes a horizontally disposed member or housing 176 which encloses electrically-actuated means for effecting rapid vibration of the member 176 in directions transverse to the direction of advancement of the tiles, each vibrator unit being supplied with electric current from a supply through a conductor 178. The upper surface or face of each of the members 176 is provided with a sheet or member 180 of abrasive material adhesively secured to the vibrating member 176.

The abrasive surface of the sheet is adapted to engage with the edges 24 of the flanges 14 of the bodies or tiles 10 as they are successively advanced through the processing station 162. The abrasive member may be a strip of metal having a file-like surface. A stationary support 181 is disposed beneath the members 176, a pair of blocks 182 for each member 176 being mounted on the stationary support 181, as shown in FIG. 18. Each member 176 is supported by thin flexible metal plates or strips 184 mounted by the blocks 182, the strips facilitating vibration of each member 176 and its abrasive member or sheet 180.

Disposed for rotation above each of the members 176 is a transverse shaft 186 journaled in suitable bearings (not shown). Mounted on each of the shafts 186 is a plurality of disc-like members or rolls 188, there being three rolls 188 on each shaft 186 in the illustrated embodiment. The peripheries of the rolls 188 engage the planar sections 12 of the tiles 10 to prevent any upward movement of the tiles during abrasion of the edges 24 of flanges 14 as the tiles are advanced through the processing station 162.

As the members 176 and abrasive members 180 vibrate or have movement in transverse directions, the corner regions 190 of the tiles are not engaged and smoothed by the members 180. FIGS. 3 and 19 illustrate an arrangement for smoothing the corner regions 190 of the edges 24 of the tile flanges 14. Supported adjacent one of the vibrator members 176 are metal files 193, each file being secured to a portion of a rail 57 by a securing screw 194, as shown in FIG. 19.

The metal files 193 extend upwardly and in an angular direction, as shown in FIG. 19, a sufficient distance to engage the surfaces of the files with the edges 24 of the flanges 14 of the tiles as the tiles are advanced by the conveyor members or chains 168. The roughened surfaces of the files smooth up the corner regions 190 of the tiles so that the edges 24 are accurately sized to accommodate the projections 18 of adjacent tiles when the tiles are in assembled relation as a wall and ceiling surfacing media. After the tiles move past the abrasive member 180 illustrated at the lefthand end of FIG. 3, the finished tiles or bodies are delivered from the support rails 57.

The operation of the apparatus for carrying out the method of the invention is as follows: A stack 30 of tiles 10 is placed in the receptacle or guide means 28, the tiles being in nested relation with the pads or projections 18 in contiguous engaging relation. The stack of tiles 30 is supported by the pairs of cam members or feeders 58 and 59. The motors 62, 133, 148 and the motor (not shown) driving the conveyor members or chains 168 are energized. The motor 62, through the gear reducing mechanism contained in housing 64, rotates the cams or feeders 58 and 59 and the conveyor chains 56 at comparatively low speeds and in synchronized relation.

As the cams or feeders are rotated, the lowermost tile 10 of the stack 30 is conveyed progressively downwardly in a vertical direction, as illustrated in FIGS. 12 through 14, and the tile delivered by gravity from the cams, as shown in FIG. 15, onto the guide and support rails 57, the upper flights of the conveyor chains 56 advancing the tiles in a left-hand direction as viewed in FIGS. 2 and 3. A pair of abutments 102 engages the tile delivered onto the support rails 57, the chains advancing the tiles through engagement of the successive pairs of abutments 102 with each tile as it is delivered from the cams 58 and 59.

The spaced rails 57 support and guide the tiles during their advancement by the conveyor chains 56. During movement of a tile through the processing station 130, the abrasive members 135, rotated by motors 132 and 133, engage and smooth up the lower surfaces of the tabs or projections 18 of the tiles by the arrangement shown in FIG. 16.

The tiles are then successively advanced through processing station 145 at which station, illustrated in FIG. 17, members 150 rotated by members 147 and 148 engage the edge surfaces 22 of the pads or projections 18 to smooth up the edges 22 and remove the residual portions 20 of bridges connecting the tiles during the tile molding operation. The tiles are advanced by the chains 56 and abutments 102 into the influence of the conveyors 168 whereby the tiles are advanced through the processing station 162 by the lugs or abutments 172 on the conveyor chains 168, the lugs engaging the ends of the pads or projections 18.

As the tiles are successively advanced by the conveyors or chains 168 through the processing station 162, the edges 24 of the flanges 14 of the tiles are engaged by the vibrating members 180 for smoothing up the major length of the edges 24. As the tiles are successively advanced past the stationary metal files, shown in FIGS. 3 and 19, the edge regions 190 are smoothed up so that the entire edge 24 of each flange 14 is smoothed and properly sized.

At the completion of the processing steps, the projections 18 and the flanges 14 of the bodies or tiles 10 are smoothed and sized so that when the tiles are assembled with the projections 18 of one tile extending beneath flanges 14 of an adjacent tile, the planar central sections 12 of the tiles will be disposed in a common plane.

FIGS. 20 and 21 illustrate a modified arrangement for smoothing the edges 24 of flanges 14 of tiles or bodies 10. The modified construction is inclusive of a cylindricallyshaped member 195 mounted upon a shaft 196 journaled in openings in the rails 57', the cylindrical member being driven by a motor 197. In this form, the surface of the cylindrical member 195 is of abrasive character and engages an edge 24 of a flange 14 throughout the length of the flange for smoothing the flange and sizing the height of the flange.

The cylindrical abrasive member 195 is of a length equal to the length of a flange 14 of a tile so that the entire length of the edge 24 may be abraded or smoothed by the cylindrical member 195. Units of the character shown in FIG. 20 may be used in lieu of the three vibrating units illustrated in FIG. 18. Through the use of the arrangement shown in FIG. 20, the metal files shown in FIG. 19 are unnecessary. The tiles, during processing by the cylindrical members 195, are held against the tile supporting rails 57 by the hold-down rolls 188 mounted upon a shaft 186.

While the axis of the cylindrical member 195 is disposed normal to the path of advancement of the tiles, it is to be understood that the cylindrical member may be mounted for rotation on a shaft askew or at an acute angle with respect to the path of advancement of the tiles.

It is apparent that, within the scope of the invention, modifications and different arrangements may be made other than as herein disclosed, and the present disclosure is illustrative merely, the invention comprehending all variations thereof.

I claim:

1. Apparatus for processing bodies of a stack of bodies, in combination, guide means for maintaining a plurality of the bodies in vertical stacked relation, pairs of rotatable cams supporting the stack of bodies, said cams being rotatable about vertical axes and having uninterrupted helically configurated surfaces for separating bodies from the stack, one pair of cams having right-hand helical configurations, the other pair of cams having left-hand helical configurations, the pairs of cams having helical configurations of opposed directions being rotated in directions to maintain a body being separated from the stack in a horizontal position, a drive shaft, motive means for rotating the drive shaft, power transmission means associated with the drive shaft for rotating the pairs of cams in opposite directions whereby a lowermost body is discharged from the rotating cams while a succeeding body is being separated by the cams from the stack, support means receiving the successively discharged bodies, and means for advancing the discharged bodies along the support means and away from the stack.

* * * * *